Patented Aug. 4, 1942

2,292,274

UNITED STATES PATENT OFFICE 2,292,274

PROCESS FOR THE PRODUCTION OF A COOKED AND PUFFED WHEAT PRODUCT

John L. Kellogg, Jr., deceased, late of Chicago, Ill., by Mary M. Kellogg, administratrix, Wilmette, Ill., assignor, by mesne assignments, to Helen L. Kellogg, Chicago, Ill.

No Drawing. Application February 6, 1939, Serial No. 254,882

7 Claims. (Cl. 99—82)

This invention relates to the production of cooked and puffed cereal products, more particularly to cooked and puffed wheat; and the primary objects of the invention are to provide an improved ready-to-eat cereal product made from wheat and a new and improved process of making such products; although the invention, in its broader aspects, is applicable to cereals generally and is so claimed herein.

In particular, the voids or cells in the puffed wheat grains are larger, the cell walls are thicker, and the product is more crisp and palatable and less pithy than puffed wheat as made heretofore.

The product, according to this invention, is quite thoroughly cooked before it is subjected to a gun puffing operation. It is, therefore, essentially a cooked product in which the starches and proteins are modified. The puffed wheat on the market is essentially a raw product, the starches and proteins being very little modified, in the sense of being cooked at least, by the brief contact with high temperature steam incident to the gun puffing operation.

The following are specific examples of a preferred process of treating wheat in accordance with the present invention:

Example 1

(a) The wheat is cooked, preferably under pressure, with an adequate amount of water and for a long enough time to thoroughly soften the kernels and give them a cooked consistency. For example 100 pounds of white wheat is cooked with 2½ gallons of water under 18 pounds steam pressure for about 1 hour.

(b) The cooked material is removed from the cooker and the hot steam separated therefrom by a suitable operation which cools the material.

(c) If the material is too wet for carrying out the next step of the process, it will be partially dried. This intermediate drying step will depend, naturally, upon the amount of water used in the cooking step, either as water added to the grain in the first instance, or as condensation incident to the steam cooking. However, the wheat because of its bran husk can be dried at a higher moisture content than corn grits or rice.

(d) The cooked, and if need be, partially dried wheat is then treated in a suitable manner for displacing the starch cells. This operation can be performed in a flaking mill but with the rolls set apart far enough so that the grain is flattened only slightly, if at all. That is, the grain should not be flaked in the sense that wheat kernels are flaked in the making of wheat flakes. The deformation is slight but sufficient, in the cooked condition of the grain, to change the internal structure of the grain for the production of the large voids and other characteristics, as above described, of the desired product.

Instead of passing the grain through flaking rolls, the wheat kernels may be given the necessary impact by other means. For example, it may be shot or otherwise made to impinge with considerable force against a steel plate; or it may be put into sacks and the sacks dropped from a considerable altitude. By any of these processes a slippage takes place as between the starch cells which makes the grain particularly susceptible to the gun puffing operation which follows. The modification of the internal structure of the kernels which results from the impact, or pressure between rolls, or otherwise, leaves the kernels in very different condition from the condition which would result from rolling them out into thin flakes. Thin flakes would not be suitable for gun puffing in accordance with the present invention.

(e) The next step is to dry the material to a suitable moisture content for gun puffing. A proper moisture content is 9%–10% which, however, may be varied to some extent.

(f) The dried material is then, preferably, tempered for several hours, 6 hours, for example, by allowing the material to stand in bins; the purpose of the tempering operation being to insure relatively uniform moisture content throughout the mass.

(g) The wheat is then puffed in a puffing gun under usual conditions and by the use of any suitable type of gun. The gun may be externally heated; or the material may be heated by introduction of high pressure steam into the gun; or both expedients may be used. The usual steam pressure is developed, say 190–200 pounds per square inch. After puffing, if desired, the puffed material may be further dried.

Example 2

(a) 100 pounds of wheat is cooked with 4 gallons of water at a steam pressure, in a rotary cooker, of 15 to 25 pounds per square inch for 40 to 80 minutes, preferably about 55 minutes, until all of the water has been absorbed, the material thoroughly softened and some modification brought about in the internal cellular structure of the grain involving probably some dextrinization of the starch.

(b) After cooking the grain is dried to a moisture content at which the kernels will not adhere to one another, preferably to a moisture content of 30% to 40%. This drying step may not be necessary if the cooked grain is not wet enough to be sticky.

(c) The cooked wheat is then subjected to pressure, impact, or other mechanically applied force sufficient to bring about displacement of the starch cells as described in Example 1.

(d) The material is then dried by any suitable means to a moisture content between 9% and 15%, preferably 12%.

(e) The partially dried material is then tempered for a period of 12 to 30 hours, preferably 24 hours, to insure relatively uniform distribution of moisture throughout the material.

(f) The material is then introduced into an air-tight puffing apparatus or gun which consists of a rotatable cylinder permanently closed at one end and having an air-tight cover at the other end, together with means for heating the cylinder to create an internal steam pressure by vaporization of moisture in the grain. Water or steam may be introduced into the gun if desired, as indicated in Example 1. The gun after being filled to about one-third capacity is rotated and heated until there is developed an internal pressure from 150 to 225 pounds per square inch, a preferred pressure being 200 pounds per square inch. The heat is applied gradually so that the desired pressure is reached in from 5 to 15 minutes; the best results being obtained, according to experience, if the temperature is controlled so that the pressure of 200 pounds is reached in approximately 7 minutes and this pressure then held for 2 minutes thereafter. The cover of the gun is then removed and as a result of the sudden reduction of the pressure in the gun the wheat undergoes an explosive expansion or puffing. The moisture content of the puffed material as it comes from the gun will be ordinarily between 5% and 8%, usually about 6%.

The grain may be flavored with salt, sugar or malt, for example, either during the cooking operation or after puffing, and before the final drying or before a toasting operation.

(g) The puffed material is preferably dried to a moisture content of 3%–4% in order to increase its crispness and keeping qualities.

The term "mechanical pressure" used herein to describe the step following the cooking and partial drying is intended to cover impact, jarring, or other similar application of mechanical force as well as a pressure between rolls sufficient to compress or slightly flatten the grains without, however, reducing them to a flake-like condition.

The term "explosively puffing," as used herein, is intended to mean the sort of instantaneous puffing accomplished, for example, by the gun method, as above described, or other method giving an explosive action due to sudden reduction of the high pressure surrounding the wheat kernels in contra-distinction to the comparative or gradual and relatively small expansion which takes place when the grain particles are subjected to heat in an oven at atmospheric pressure.

This application is a continuation in part of application of John L. Kellogg, Jr., Serial No. 127,672, filed February 25, 1937, for "Puffed cereal product and process of making same." (Patented January 13, 1942, as No. 2,269,536.)

What is claimed is:

1. Process of producing a puffed and ready-to-eat cereal product which comprises: cooking the cereal with water; subjecting it to mechanical pressure to alter the internal structure of the grain without reducing it to a flaked condition; drying the material; tempering it by allowing the material to stand until the moisture content is substantially equalized; and explosively puffing the dried and tempered material.

2. Process of producing a puffed and ready-to-eat cereal product which comprises: cooking the cereal with water; drying it; subjecting it to mechanical pressure to alter the internal structure of the grain without reducing it to a flaked condition; drying the material again; tempering it by allowing the material to stand until the moisture content is substantially equalized; and explosively puffing the dried and tempered material.

3. Process of producing a cooked and puffed cereal product which comprises: cooking the cereal with water; subjecting it to mechanical pressure to alter the internal structure of the grain without reducing it to a flaked condition; drying the material to water content suitable for gun-puffing; and explosively puffing the dried material.

4. Process of producing a cooked and puffed cereal product which comprises: cooking the cereal with water; subjecting it to mechanical pressure to alter the internal structure of the grain without reducing it to a flaked condition; drying the material to a moisture content of 9%–15%; and explosively puffing the dried material.

5. Process of producing a cooked and puffed wheat product which comprises: cooking the wheat with water; subjecting the cooked material to mechanical pressure which modifies the internal structure of the grain without reducing it to a flaked condition; drying the wheat to a water content suitable for explosive puffing; and thereafter explosively puffing the material.

6. Process of producing a cooked and puffed wheat product which comprises: cooking the wheat for about 1 hour at about 18 pounds steam pressure with water in the proportion of 2½ gallons to 100 pounds of wheat; removing the material from the cooker and separating the hot steam from the material; subjecting the material to mechanical pressure to alter the internal structure of the grain without reducing it to a flaked condition; drying the material down to about 9%–10% moisture; and thereafter explosively puffing the material.

7. Process of producing a cooked and puffed wheat product which comprises: cooking the wheat in water; partially drying the material; subjecting the material to mechanical pressure to alter the internal structure of the grain without reducing it to a flaked condition; drying the material to a suitable water content for explosive puffing; and thereafter explosively puffing the material.

MARY M. KELLOGG,
*Administratrix of the Estate of John L. Kellogg, Jr., deceased.*